(12) United States Patent
Ahn et al.

(10) Patent No.: US 11,373,451 B2
(45) Date of Patent: Jun. 28, 2022

(54) DEVICE AND METHOD FOR RECOGNIZING GESTURE

(71) Applicant: KOREA ELECTRONICS TECHNOLOGY INSTITUTE, Seongnam-si (KR)

(72) Inventors: Yang Keun Ahn, Seoul (KR); Young Choong Park, Goyang-si (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 397 days.

(21) Appl. No.: 16/435,085

(22) Filed: Jun. 7, 2019

(65) Prior Publication Data
US 2019/0377938 A1 Dec. 12, 2019

(30) Foreign Application Priority Data
Jun. 8, 2018 (KR) .................... 10-2018-0066274

(51) Int. Cl.
G06V 40/20 (2022.01)
G06T 7/55 (2017.01)
G06F 3/01 (2006.01)

(52) U.S. Cl.
CPC ............. *G06V 40/20* (2022.01); *G06F 3/017* (2013.01); *G06T 7/55* (2017.01); *G06T 2207/10016* (2013.01)

(58) Field of Classification Search
CPC .............. G06K 9/00335; G06T 7/55; G06T 2207/10016; G06T 7/20; G06T 2207/10028; G06T 2207/20056; G06T 7/11; G06F 3/017; G06F 3/005; G06V 40/20; G06V 10/28; G06V 40/28; G01P 3/38

USPC ........................................... 382/103
See application file for complete search history.

(56) References Cited

U.S. PATENT DOCUMENTS

| | | | | |
|---|---|---|---|---|
| 10,846,521 B2 * | 11/2020 | Tai | ........... | G06N 3/0454 |
| 11,210,551 B2 * | 12/2021 | Qiu | ........... | G06T 3/60 |
| 2006/0133785 A1 * | 6/2006 | Ko | ........... | G06T 7/20 396/54 |
| 2010/0309288 A1 * | 12/2010 | Stettner | ........... | H04N 5/33 348/43 |

(Continued)

FOREIGN PATENT DOCUMENTS

| | | |
|---|---|---|
| KR | 10-2011-0007806 A | 1/2011 |
| KR | 10-2017-0046519 A | 5/2017 |

OTHER PUBLICATIONS

Korean Office Action for corresponding Korean application No. 10-2018-0066274 dated Feb. 3, 2020.

*Primary Examiner* — Michael S Osinski
(74) *Attorney, Agent, or Firm* — Hauptman Ham, LLP

(57) ABSTRACT

Provided are a device and method for recognizing a gesture. The device includes a video image acquirer configured to acquire a video including a gesture object by photographing the gesture object, a center point detector configured to detect a center point of the gesture object in frames of the acquired video, a velocity calculator configured to calculate a velocity of the gesture object by calculating a difference between motion coordinates on each axis on the basis of the center point of the gesture object, and a gesture recognizer configured to recognize a gesture of the gesture object by comparing the calculated velocity of the gesture object with a preset velocity.

10 Claims, 8 Drawing Sheets

(56) References Cited

U.S. PATENT DOCUMENTS

| | | | | |
|---|---|---|---|---|
| 2012/0052947 A1* | 3/2012 | Yun | ............... | G09B 19/0015 |
| | | | | 463/32 |
| 2012/0163661 A1* | 6/2012 | Lee | ............... | G06V 40/23 |
| | | | | 382/103 |
| 2014/0300684 A1* | 10/2014 | Fagadar-Cosma | ..... | H04N 7/142 |
| | | | | 348/14.03 |
| 2014/0340307 A1* | 11/2014 | Lee | ............... | G06K 9/00355 |
| | | | | 345/156 |
| 2015/0287215 A1* | 10/2015 | Ohba | ............... | H04N 13/128 |
| | | | | 382/103 |
| 2016/0292533 A1* | 10/2016 | Uchiyama | ............... | G06T 7/55 |
| 2020/0143150 A1* | 5/2020 | Nakamura | ............... | G06K 9/00389 |

* cited by examiner

DEVICE AND METHOD FOR RECOGNIZING GESTURE

CROSS-REFERENCE TO RELATED APPLICATION

This application claims priority to and the benefit of Korean Patent Application No. 10-2018-0066274, filed on Jun. 8, 2018, the disclosure of which is incorporated herein by reference in its entirety.

BACKGROUND

1. Field of the Invention

The present invention relates to a device and method for recognizing a gesture and more particularly, to a device and method for calculating a center point of a gesture object by extracting information on the gesture object through a three-dimensional (3D) depth camera and then recognizing a gesture of the gesture object using a velocity of the gesture object according to a motion of the gesture object.

2. Discussion of Related Art

According to a general technique for detecting a hand through images, after a hand is detected through a camera, the trajectory of the hand is analyzed by linearly tracking a position of the hand, and it is recognized accordingly that the hand is moved up, down, left, or right.

As the technique for detecting a hand through images, there is a method of detecting a candidate region for a hand in accumulated images and comparing the detected candidate region with a previously stored candidate region for a hand.

However, it is necessary to acquire candidate images for a hand and compare objects in all the candidate images with each other, and it is also necessary to stably detect a hand in a variety of shapes under various circumstances. Consequently, an algorithm of a corresponding system is complex, and it is difficult to implement the algorithm.

SUMMARY OF THE INVENTION

The present invention is directed to providing a device and method for acquiring information on a gesture object through a three-dimensional (3D) depth camera so as to readily detect a gesture, calculating a 3D center point of the acquired gesture object, and then recognizing a gesture through a velocity of the gesture object based on a difference between motion coordinates of the center point of the gesture object.

Objectives of the present invention are not limited to the aforementioned objective, and other objectives which have not been mentioned above will be clearly understood by those of ordinary skill in the art from the following description.

According to an aspect of the present invention, there is provided a device for recognizing a gesture, the device including: a video image acquirer configured to acquire a video including a gesture object by photographing the gesture object; a center point detector configured to detect a center point of the gesture object in frames of the acquired video; a velocity calculator configured to calculate a velocity of the gesture object by calculating a difference between motion coordinates on each axis on the basis of the center point of the gesture object; and a gesture recognizer configured to recognize a gesture of the gesture object by comparing the calculated velocity of the gesture object with a preset velocity.

The video image acquirer may be a three-dimensional (3D) depth camera.

The center point detector may binarize a frame of the acquired video, determine whether a blob is detected in the binarized frame, and when a blob is detected in the frame, detect a center point of the blob by separately calculating average values of 3D pixels of the detected blob.

The velocity calculator may set a frame in which the center point of the blob has been initially detected as a reference frame among detected frames, initialize the center point of the blob, and then when the center point of the blob is detected in a subsequent frame, calculate axis-specific center point velocities of the blob using coordinate differences between the center point of the blob detected in the reference frame and the center point of the blob detected in the subsequent frame and the number of frames therebetween.

The gesture recognizer may recognize an axis on which the center point velocity of the blob is higher than the preset velocity as a gesture.

The gesture recognizer may compare the axis-specific center point velocities of the blob with each other and recognize an axis on which the center point velocity of the blob is the highest as a gesture.

According to another aspect of the present invention, there is provided a method of recognizing a gesture, the method including: acquiring a video including a gesture object by photographing the gesture object; detecting a center point of the gesture object in frames of the acquired video; calculating a velocity of the gesture object by calculating a difference between motion coordinates on each axis on the basis of the center point of the gesture object; and recognizing a gesture of the gesture object by comparing the calculated velocity of the gesture object with a preset velocity.

The acquiring of the video including the gesture object may include acquiring the video including the gesture object through a 3D depth camera.

The detecting of the center point of the gesture object may include: binarizing a frame of the acquired video; determining whether a blob of the gesture object is detected in the binarized frame; and when a blob is detected in the frame, detecting a center point of the blob by separately calculating average values of 3D pixels of the detected blob.

The calculating of the velocity of the gesture object may include: setting a frame in which the center point of the blob has been initially detected as a reference frame among detected frames and initializing the center point of the blob; after the reference frame is detected, determining whether the center point of the blob has been detected in a subsequent frame; when it is determined that the center point of the blob has been detected, determining whether there are a preset minimum number of required frames between the reference frame and the frame in which the center point of the blob has been detected; and when it is determined that there are not the preset minimum number of required frames, determining whether the center point of the blob has been detected in a subsequent frame, and when it is determined that there are the preset minimum number of required frames, calculating axis-specific center point velocities of the blob using coordinate differences between the center point of the blob detected in the reference frame and the center point of the blob detected in the subsequent frame.

The recognizing of the gesture of the gesture object may include recognizing an axis on which the center point velocity of the blob is higher than the preset velocity as a gesture of the gesture object.

The recognizing of the gesture of the gesture object may include comparing the axis-specific center point velocities of the blob with each other and recognizing an axis on which the center point velocity of the blob is the highest as a gesture of the gesture object.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Advantages and features of the present invention and methods for achieving them will be made clear from embodiments described below in detail with reference to the accompanying drawings. However, the present invention may be embodied in many different forms and should not be construed as being limited to the embodiments set forth herein. Rather, these embodiments are provided so that this disclosure will be thorough and complete, and will fully convey the scope of the present invention to those of ordinary skill in the art to which the present invention pertains. The present invention is merely defined by the claims. Meanwhile, terms used herein are for the purpose of describing embodiments only and are not intended to limit the present invention. As used herein, the singular forms are intended to include the plural forms as well unless the context clearly indicates otherwise. The terms "comprises" and/or "comprising" used herein indicate the presence of stated elements, steps, operations, and/or devices and do not preclude the presence or addition of one or more other elements, steps, operations, and/or devices.

Figure 1:
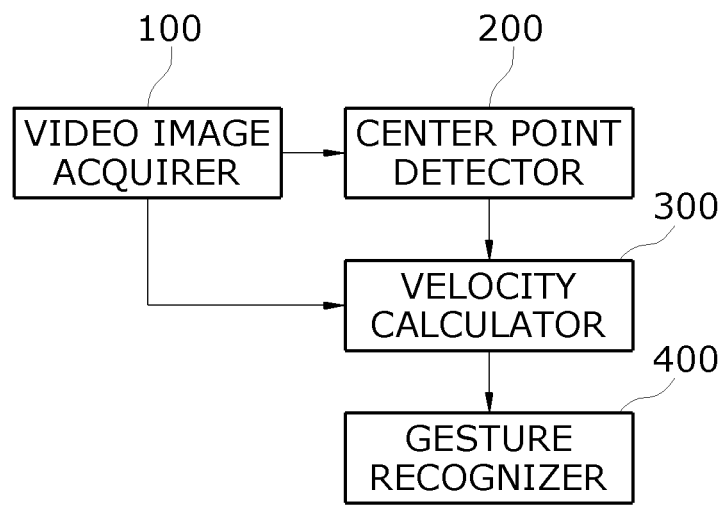
FIG. 1 is a functional block diagram illustrating a device for recognizing a gesture according to an exemplary embodiment of the present invention.

Hereinafter, exemplary embodiments of the present invention will be described in detail with reference to the accompanying drawings. FIG. 1 is a functional block diagram illustrating a device and method for recognizing a gesture according to an exemplary embodiment of the present invention.

As shown in FIG. 1, a device for recognizing a gesture according to an exemplary embodiment of the present invention includes a video image acquirer 100, a center point detector 200, a velocity calculator 300, and a gesture recognizer 400.

The video image acquirer 100 acquires video information including a gesture object by photographing the gesture object. At this time, a three-dimensional (3D) depth camera for acquiring a 3D image may be used as the video image acquirer 100. In this exemplary embodiment, a hand is described as the gesture object, but the gesture object is not limited thereto.

The center point detector 200 detects a center point of the gesture object in frames of the acquired video information.

The velocity calculator 300 obtains a velocity of the gesture object by calculating a difference between motion coordinates on each axis on the basis of the detected center point of the gesture object. Here, axes include an X-axis for distinguishing between left and right, a Y-axis for distinguishing between up and down, and a Z-axis for determining a depth of an image.

Figure 2A:
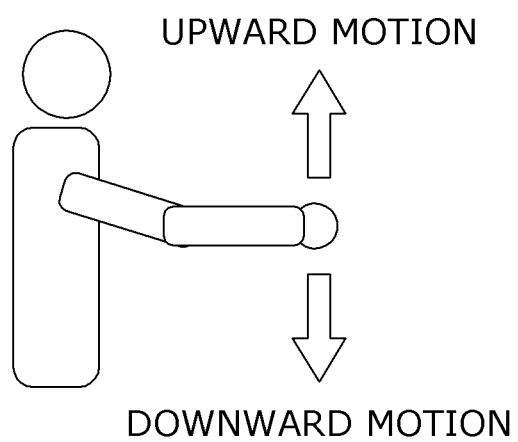
FIGS. 2A to 2C are reference diagrams illustrating kinds of gestures according to an exemplary embodiment of the present invention.
Figure 2B:
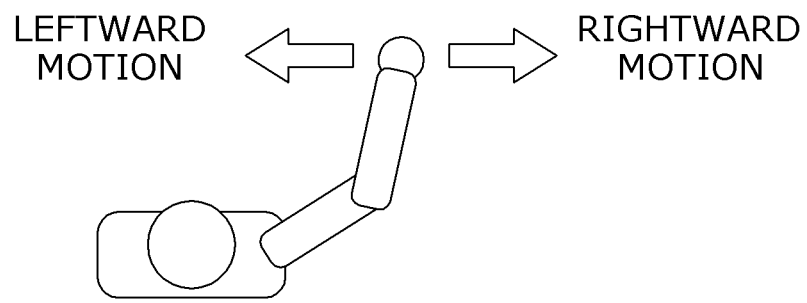
Figure 2C:
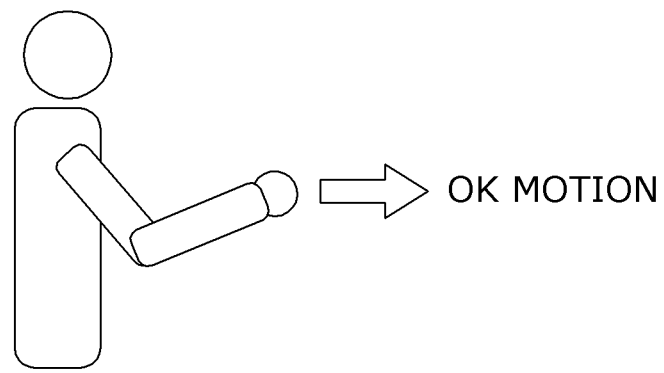

The gesture recognizer 400 recognizes a gesture of the gesture object by comparing the calculated velocity of the gesture object with a preset velocity. This exemplary embodiment describes a gesture of an upward or downward motion shown in FIG. 2A, a gesture of a leftward or rightward motion shown in FIG. 2B, and a gesture of "OK" motion shown in FIG. 2C. However, gestures are not limited thereto, and it is possible to recognize gestures made in various directions.

According to an exemplary embodiment of the present invention, a simple algorithm is used to extract a center point of a gesture object from a frame of a video captured through a camera and recognize a gesture in a corresponding axis on the basis of a movement velocity of the center point of the gesture object. Therefore, it is possible to increase a recognition rate of a gesture of a gesture object and reduce a misrecognition rate.

Figure 3:
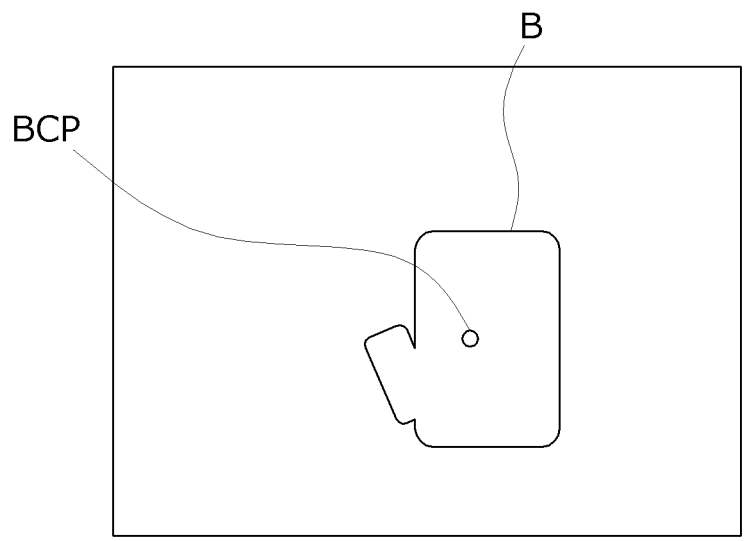
FIG. 3 is a reference diagram illustrating a center point detection process according to an exemplary embodiment of the present invention.

Meanwhile, as shown in FIG. 3, the center point detector 200 according to an exemplary embodiment of the present invention binarizes a frame of the captured video into black and white and detects a blob (B) of a hand, which is the gesture object, in the binarized frame. The center point detector 200 may detect a center point BCP of the blob by separately calculating average values of 3D pixels of the detected blob.

As such, when the center point detector 200 binarizes a frame of a captured video, detects a blob of a gesture object through the binarized frame, and then detects a center point, there is no problem in using objects of different shapes or colors to make a gesture unlike a technique for tracking a shape or color of a gesture object.

Meanwhile, the velocity calculator 300 sets a frame in which the center point of the blob has been initially detected as a reference frame among frames of the captured video and initializes the center point of the blob. Subsequently, when the center point of the blob is detected in a subsequent frame, the velocity calculator 300 calculates axis-specific center point velocities of the blob using coordinate differences between the center point of the blob detected in the reference frame and the center point of the blob detected in the subsequent frame and the number of frames therebetween.

Since a velocity is calculated by dividing a distance by a time, it is possible to calculate axis-specific center point velocities of the blob by dividing a distance between the center point of the blob extracted from the reference frame and the center point of the blob extracted from the subsequent frame by the number of frames between the reference frame and the subsequent frame from which the center point of the blob has been extracted.

Figure 4A:
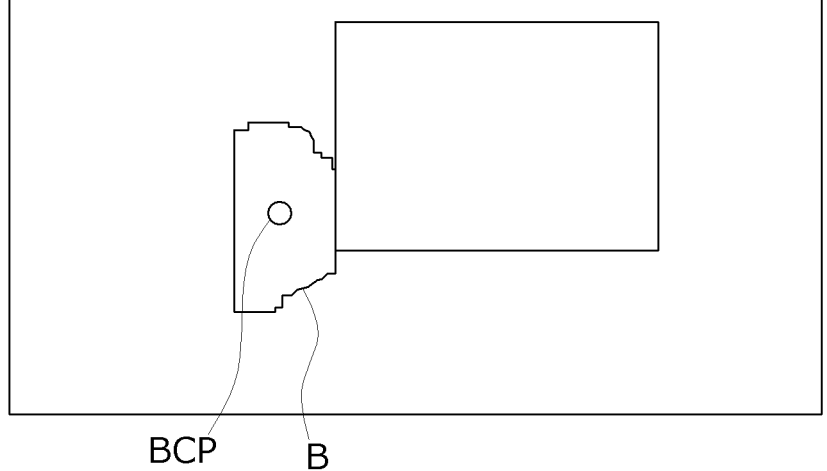
FIGS. 4A and 4B are reference diagrams illustrating an operation process according to an exemplary embodiment of the present invention.
Figure 4B:
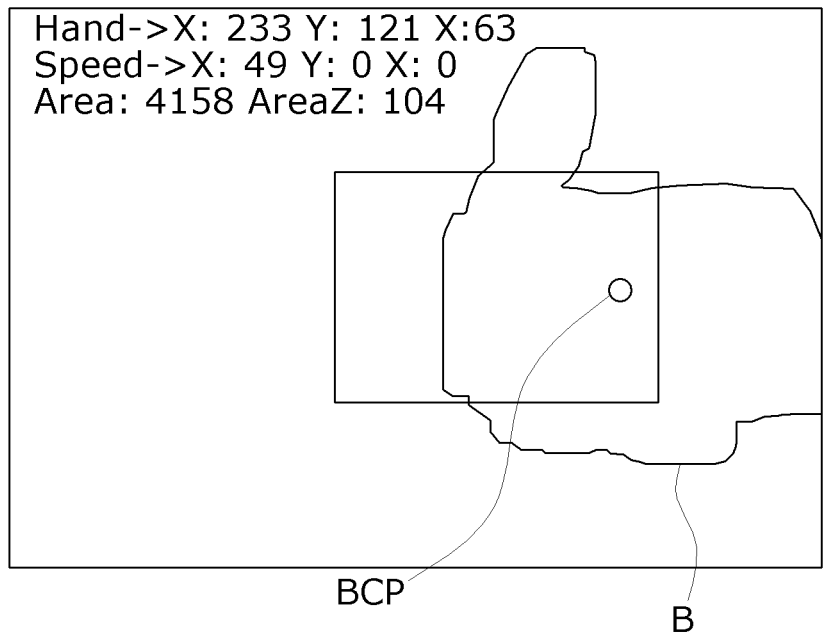

For example, a case in which a center point (EX(86), EY(153), EZ(50)) of a blob (B) is detected in an initial frame as shown in FIG. 4A and then a center point (CX(233), CY(121), CZ(63)) of the blob is detected in the fourth frame as shown in FIG. 4B will be described.

First, in the process of calculating a center point velocity of the blob, there are three frames between the reference frame and the current frame in which the center point has been detected. For this reason, a time value is 3.

Therefore, it is possible to calculate axis-specific velocities as follows: X-axis (SX)=(CX−EX)/C_FT=(233−86)/3=49, Y-axis (SY)=(CY−EY)/C_FT=(121−153)/3=−10, and Z-axis (SZ)=(CZ−EZ)/C_FT=(63−50)/3=4.

Since the X-axis velocity (SX) is 49 which is greater than 0, a gesture of the gesture object moving to the right is recognized. When the X-axis velocity (SX) is −49, the X-axis velocity (SX) is smaller than 0, and thus a gesture of the gesture object moving to the left is recognized.

Meanwhile, in another exemplary embodiment of the present invention, the gesture recognizer 400 may recognize an axis on which the center point velocity of the blob is higher than the preset velocity as a gesture of the gesture object.

In an exemplary embodiment of the present invention, a corresponding axis is recognized as a gesture of a gesture object on the basis of a preset velocity, whereas in another exemplary embodiment, the gesture recognizer 400 may compare axis-specific center point velocities of a blob with each other and recognize an axis on which the center point velocity of the blob is the highest as a gesture of a gesture object.

Figure 5:
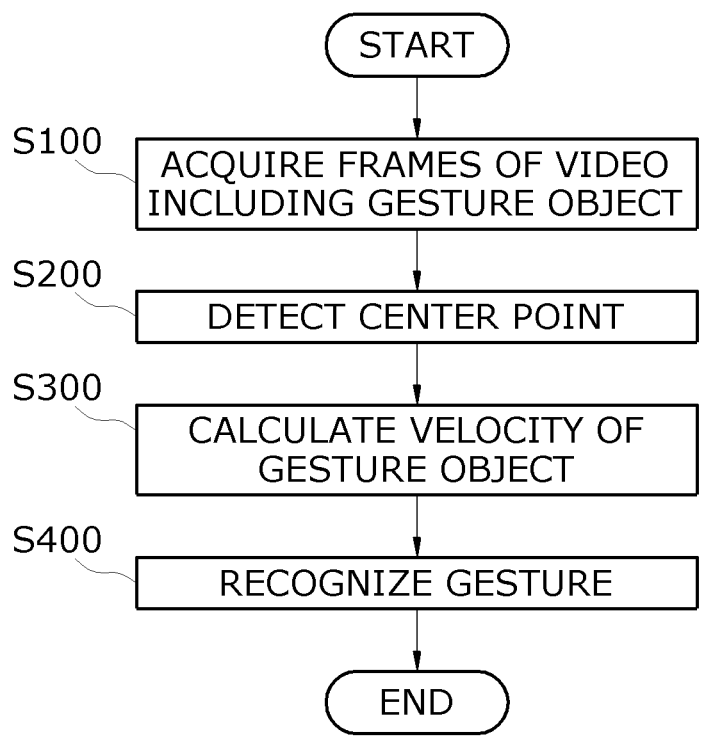
FIG. 5 is a flowchart illustrating a method of recognizing a gesture according to an exemplary embodiment of the present invention.

A method of recognizing a gesture according to an exemplary embodiment of the present invention will be described below with reference to FIG. 5.

First, a video including a gesture object is acquired by photographing the gesture object (S100). The operation (S100) of acquiring a video including a gesture object may be performed by a 3D depth camera for acquiring a video including 3D axis information.

Subsequently, a center point of the gesture object is detected in frames of the acquired video (S200). When a center point of the gesture object is initially detected in a frame, the frame is set up as a reference frame by initializing a frame counter FC to 0, the center point of the gesture object is set up as reference coordinates, and then the center point of the gesture object (EX=−1, EY=−1, EZ=−1) is initialized. On the other hand, when a center point of the gesture object is detected in a frame after a reference frame is set, initialization is not performed for the frame.

Figure 6:
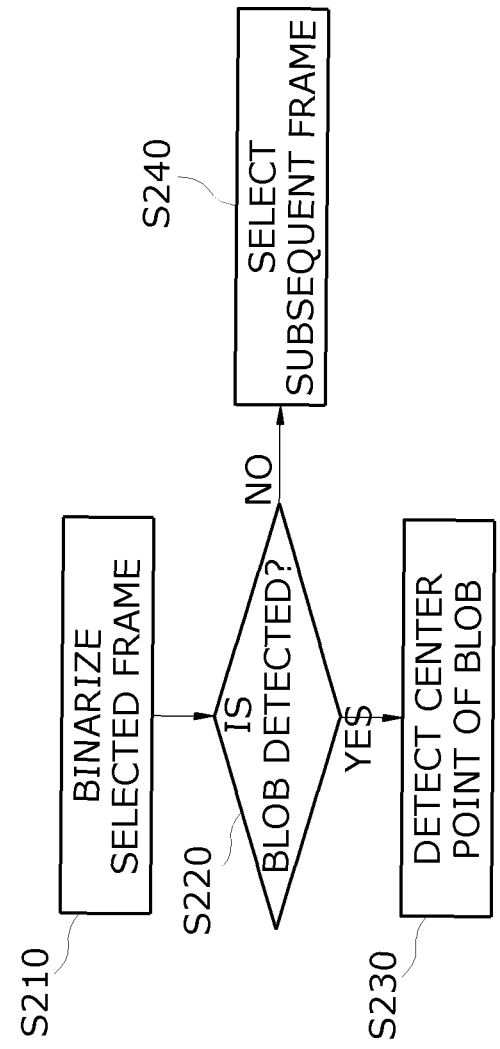
FIG. 6 is a flowchart illustrating a center point detection process according to an exemplary embodiment of the present invention.

The operation (S200) of detecting the center point of the gesture object will be described in detail below with reference to FIG. 6.

First, a selected frame of the captured video is binarized (S210).

Subsequently, it is determined whether a blob of the gesture object is detected in the binarized frame (S220).

When it is determined in operation S220 that a blob has been detected in the frame (YES), average values of 3D pixels of the detected blob are separately calculated, and a center point of the blob is detected (S230). In other words, when a blob is detected in the selected frame, an area BA of the blob is calculated, and center point coordinates (CX, CY) and a depth value (CZ) are extracted.

When it is determined in operation S220 that a blob has not been detected in the frame (NO), the frame counter FC is increased by 1, and the operation of detecting a blob is performed on the subsequent frame (S240).

Subsequently, a velocity of the gesture object is obtained by calculating a difference between motion coordinates on each axis on the basis of the detected center point of the gesture object (S300). When the blob is detected in the reference frame, axis-specific velocities are initialized to 0.

Figure 7:
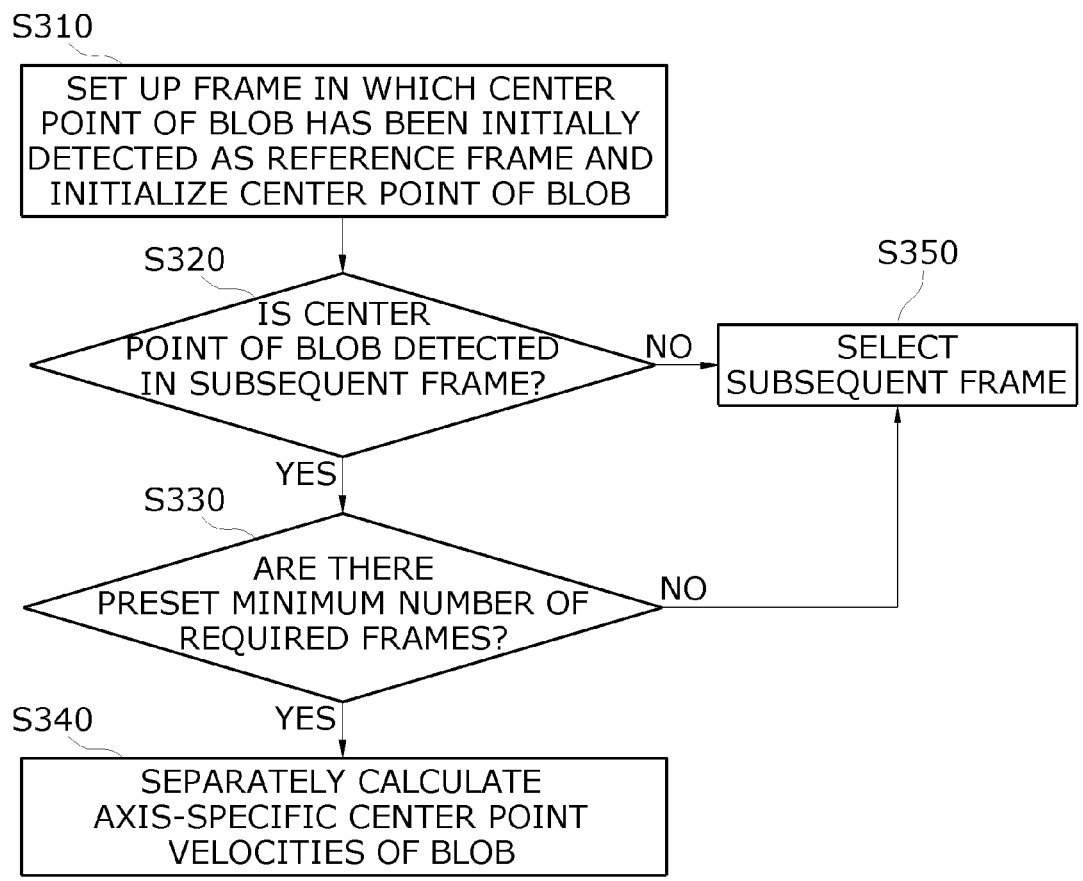
FIG. 7 is a flowchart illustrating a process for detecting a center point velocity according to an exemplary embodiment of the present invention.

The operation (S300) of calculating a velocity of the gesture object will be described in detail below with reference to FIG. 7.

First, the frame in which the center point of the blob has been initially detected is set up as the reference frame among detected frames, and the center point of the blob is initialized (S310).

After the reference frame is set up, it is determined whether the center point of the blob is detected in a subsequent frame (S320).

When it is determined in operation S320 that the center point of the blob is detected (YES), it is determined whether there are a preset minimum number of required frames between the reference frame and the frame in which the center point of the blob has been detected (S330).

When it is determined that there are the preset minimum number of required frames (YES), axis-specific center point velocities of the blob are calculated using coordinate differences between the center point of the blob detected in the reference frame and the center point of the blob detected in the subsequent frame (S340). In other words, an axis-specific velocity is calculated by subtracting a coordinate of the 3D center point of the blob in the reference frame on the corresponding axis from a coordinate of the 3D center point of the blob in the subsequent frame on the corresponding axis and then dividing the resultant by the minimum number of required frames.

Figure 8:
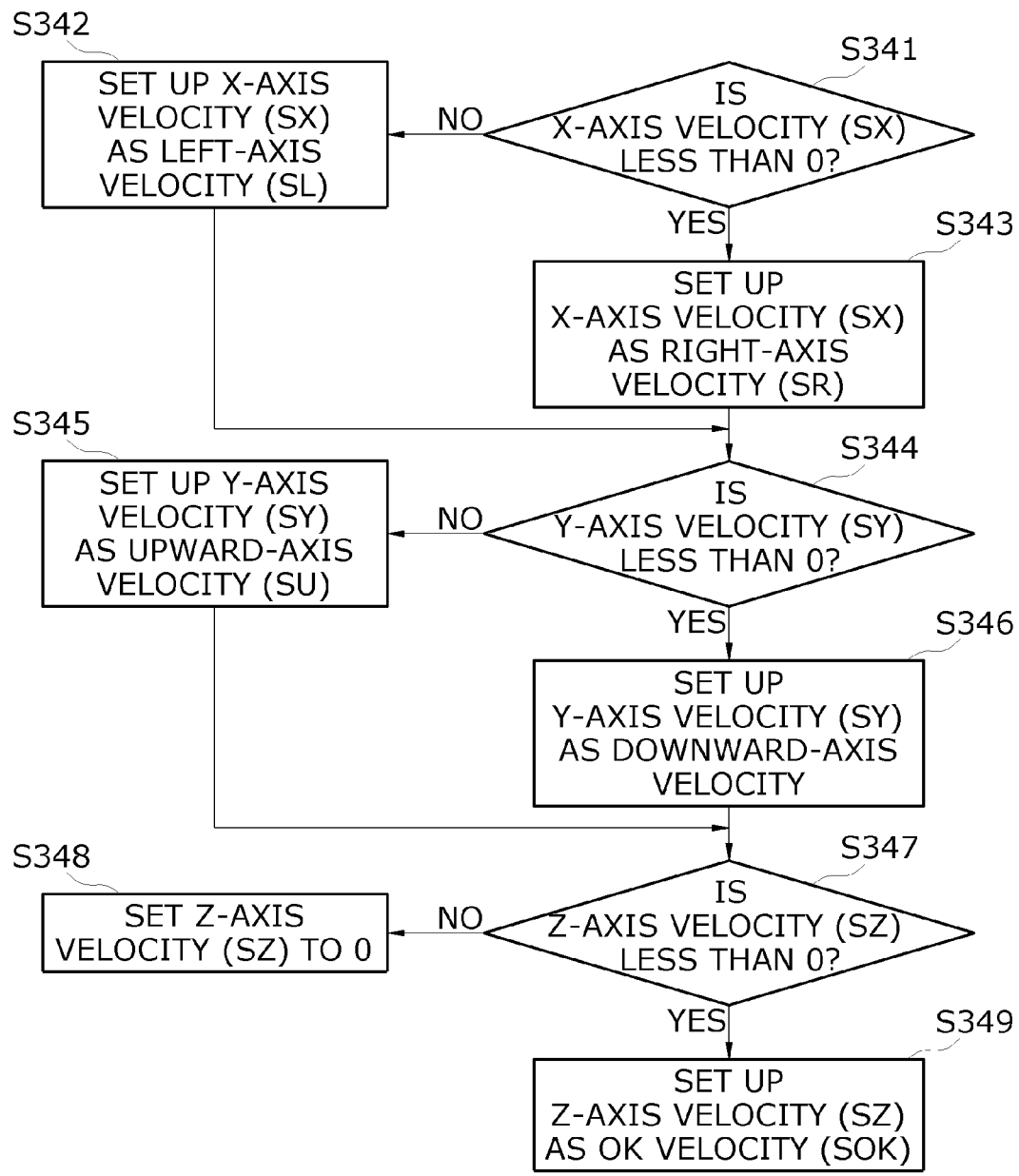
FIG. 8 is a flowchart illustrating a process for detecting a center point direction according to an exemplary embodiment of the present invention.

A process of detecting a center point direction according to an exemplary embodiment of the present invention will be described below with reference to FIG. 8.

First, it is determined whether an X-axis velocity (SX) is less than 0 (S341).

When the X-axis velocity (SX) is less than 0 (YES), it means that the gesture object is moving leftward, and the X-axis velocity (SX) is set up as a left-axis velocity (SL) (S342). Here, the magnitude of the left-axis velocity (SL) is calculated using an absolute value.

On the other hand, when the X-axis velocity (SX) is greater than 0 (NO), it means that the gesture object is moving rightward, and the X-axis velocity (SX) is set up as a right-axis velocity (SR) (S343).

Subsequently, it is determined whether a Y-axis velocity (SY) is less than 0 (S344).

When the Y-axis velocity (SY) is less than 0 (YES), it means that the gesture object is moving upward, and the Y-axis velocity (SY) is set up as an upward-axis velocity (SU) (S345). Here, the magnitude of the upward-axis velocity (SU) is calculated using an absolute value.

On the other hand, when the Y-axis velocity (SY) is greater than 0 (NO), it means that the gesture object is moving downward, and the Y-axis velocity (SY) is set up as a downward-axis velocity (SD) (S346).

Also, it is determined whether a Z-axis velocity (SZ) is less than 0 (S347).

When the Z-axis velocity (SZ) is less than 0 (YES), it means that the gesture object is not moving forward, and the Z-axis velocity (SZ) is set to 0 (S348).

On the other hand, when the Z-axis velocity (SZ) is greater than 0 (NO), it means that the gesture object is moving in a depth direction, and the Z-axis velocity (SZ) is set up as an OK velocity (SOK) (S349).

Meanwhile, when it is determined in operation S330 that there are not the preset minimum number of required frames (NO), a subsequent frame is selected (S350), and then operation S320 of detecting a center point of the blob is performed.

Subsequently, a gesture of the gesture object is recognized by comparing the calculated velocity of the gesture object with a preset velocity (S400). At this time, an axis on which the center point velocity of the blob is higher than the preset velocity may be recognized as a gesture of the gesture object.

Figure 9:
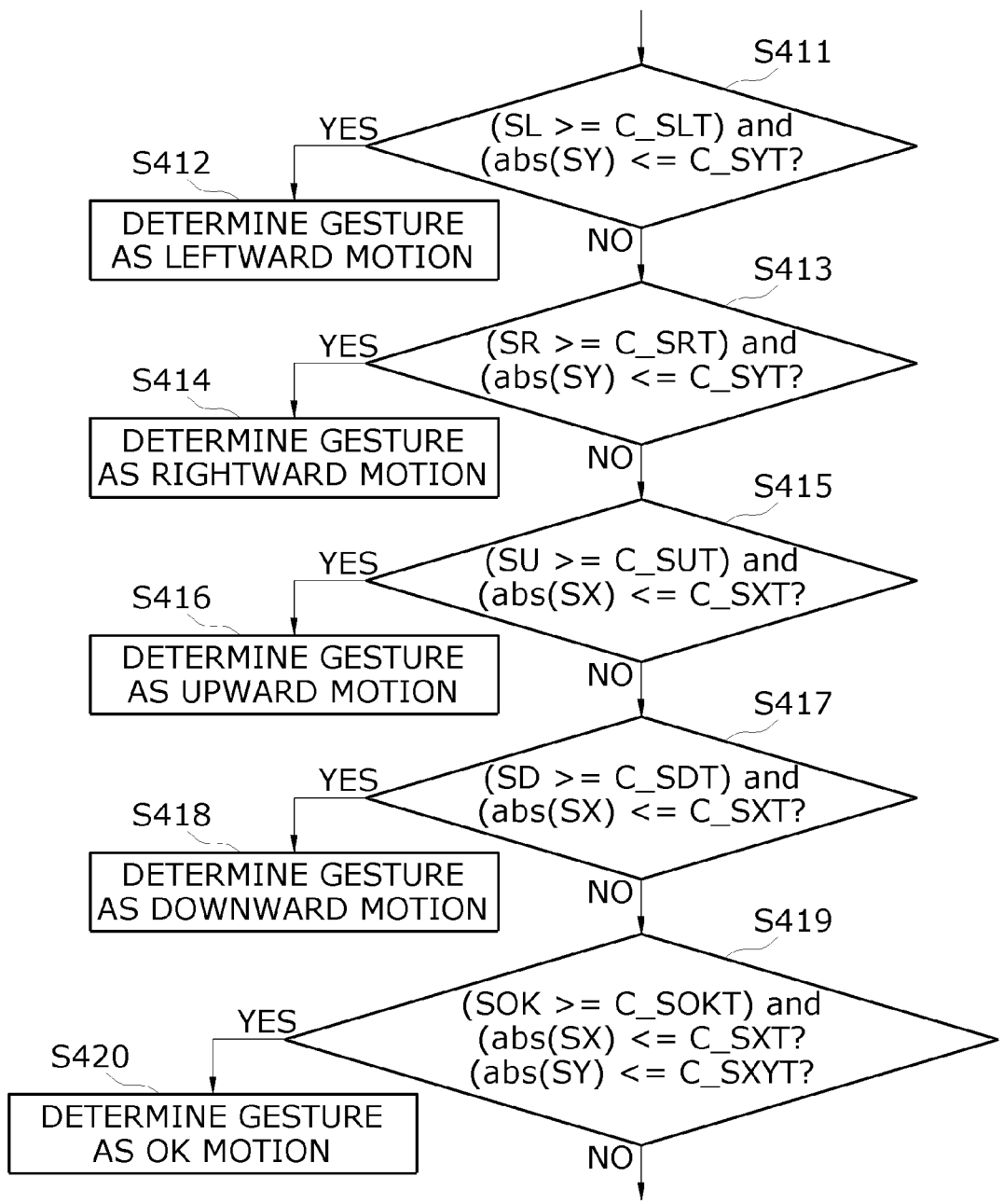
FIG. 9 is a flowchart illustrating a process for recognizing a gesture according to an exemplary embodiment of the present invention.

A detailed method of recognizing the gesture of the gesture object will be described below with reference to FIG. 9.

First, it is determined whether the left-axis velocity (SL) is higher than or equal to a preset velocity and whether the Y-axis velocity (SY) is less than or equal to a preset velocity (S411).

When the left-axis velocity (SL) is higher than or equal to the preset velocity and the Y-axis velocity (SY) is less than or equal to the preset velocity (YES), the gesture of the gesture object is recognized as a leftward motion (S412).

When the left-axis velocity (SL) is higher than or equal to the preset velocity and the Y-axis velocity (SY) is not less than or equal to the preset velocity (NO), it is determined whether the right-axis velocity (SR) is higher than or equal to a preset velocity and whether the Y-axis velocity (SY) is less than or equal to a preset velocity (S413).

When the right-axis velocity (SR) is higher than or equal to the preset velocity and the Y-axis velocity (SY) is less than or equal to a preset velocity (YES), the gesture of the gesture object is recognized as a rightward motion (S414).

Meanwhile, when the right-axis velocity (SR) is higher than or equal to the preset velocity and the Y-axis velocity (SY) is not less than or equal to the preset velocity (NO), it is determined whether the upward-axis velocity (SU) is higher than or equal to a preset velocity and whether the X-axis velocity (SX) is less than or equal to a preset velocity (S415).

When the upward-axis velocity (SU) is higher than or equal to the preset velocity and the X-axis velocity (SX) is less than or equal to the preset velocity (YES), the gesture of the gesture object is recognized as an upward motion (S416).

When the upward-axis velocity (SU) is higher than or equal to the preset velocity and the X-axis velocity (SX) is not less than or equal to the preset velocity (NO), it is determined whether the downward-axis velocity (SD) is higher than or equal to a preset velocity and whether the X-axis velocity (SX) is less than or equal to a preset velocity (S417).

When the downward-axis velocity (SD) is higher than or equal to the preset velocity and the X-axis velocity (SX) is less than or equal to the preset velocity (YES), the gesture of the gesture object is recognized as a downward motion (S418).

When the downward-axis velocity (SD) is higher than or equal to the preset velocity and the X-axis velocity (SX) is not less than or equal to the preset velocity (NO), it is determined whether the OK velocity (SOK) is higher than or equal to a preset velocity and whether the X-axis and Y-axis velocities (SX and SY) are less than or equal to a preset velocity (S419).

When the OK velocity (SOK) is higher than or equal to the preset velocity and the X-axis and Y-axis velocities (SX and SY) are less than or equal to the preset velocity (YES), the gesture of the gesture object is recognized as an OK motion (S420).

Here, the preset velocities may be set up differently according to the axes or to be identical.

Meanwhile, in an operation (S400) of recognizing a gesture of a gesture object according to another exemplary embodiment of the present invention, axis-specific center point velocities of a blob may be compared with each other, and an axis on which the center point velocity of the blob is the highest may be recognized as a gesture of the gesture object.

According to an exemplary embodiment of the present invention, unlike a related art which involves complex tracking, a simple algorithm is used to detect a 3D center point by extracting information on a gesture object with a 3D depth camera, calculate a velocity of the center point using a difference between coordinates of the 3D center point moved on each axis, and recognize an up, down, left, right, or selection gesture by comparing the calculated velocities with a set velocity. Therefore, it is possible to increase a recognition rate of a gesture of a gesture object and reduce a misrecognition rate.

According to an exemplary embodiment of the present invention, unlike a technique for tracking a shape or color of a gesture object, there is no problem even when objects of different shapes or colors are used to make a gesture.

Embodiments of the present invention have been described in detail above with reference to the accompanying drawings, but the embodiments are merely exemplary. Those of ordinary skill in the technical field to which the present invention pertains should understand that various modifications and alterations can be made within the technical spirit of the present invention. Therefore, the scope of the present invention is not limited to the disclosed embodiments and defined by the following claims.

What is claimed is:

1. A device for recognizing a gesture, the device comprising:
   a video image acquirer configured to acquire a video including a gesture object by photographing the gesture object;
   a center point detector configured to detect a center point of the gesture object in frames of the acquired video;
   a velocity calculator configured to calculate a velocity of the gesture object by calculating a difference between motion coordinates on each axis on the basis of the center point of the gesture object; and
   a gesture recognizer configured to recognize a gesture of the gesture object by comparing the calculated velocity of the gesture object with a preset velocity,
   wherein the center point detector binarizes a frame of the acquired video, determines whether a blob is detected in the binarized frame, and when the blob is detected in the frame, detects a center point of the blob by separately calculating average values of three-dimensional (3D) pixels of the detected blob.

2. The device of claim 1, wherein the video image acquirer is a three-dimensional (3D) depth camera.

3. The device of claim 1, wherein the velocity calculator sets up a frame in which a center point of a blob has been initially detected as a reference frame among detected frames, initializes the center point of the blob, and then when the center point of the blob is detected in a subsequent frame, calculates axis-specific center point velocities of the blob using coordinate differences between the center point of the blob detected in the reference frame and the center point of the blob detected in the subsequent frame and the number of frames therebetween.

4. The device of claim 3, wherein the gesture recognizer recognizes an axis on which the center point velocity of the blob is higher than the preset velocity as a gesture of the gesture object.

5. The device of claim 3, wherein the gesture recognizer compares the axis-specific center point velocities of the blob with each other and recognizes an axis on which the center point velocity of the blob is the highest as a gesture of the gesture object.

6. A method of recognizing a gesture, the method comprising:
  acquiring a video including a gesture object by photographing the gesture object;
  detecting a center point of the gesture object in frames of the acquired video;
  calculating a velocity of the gesture object by calculating a difference between motion coordinates on each axis on the basis of the center point of the gesture object; and
  recognizing a gesture of the gesture object by comparing the calculated velocity of the gesture object with a preset velocity,
  wherein the detecting of the center point of the gesture object comprises:
    binarizing a frame of the acquired video;
    determining whether a blob of the gesture object is detected in the binarized frame; and
    when the blob is detected in the frame, detecting a center point of the blob by separately calculating average values of three-dimensional (3D) pixels of the detected blob.

7. The method of claim 6, wherein the acquiring of the video including the gesture object comprises acquiring the video including the gesture object through a three dimensional (3D) depth camera.

8. The method of claim 6, wherein the calculating of the velocity of the gesture object comprises:
  setting a frame in which a center point of a blob has been initially detected as a reference frame among detected frames and initializing the center point of the blob;
  after the reference frame is set, determining whether the center point of the blob has been detected in a subsequent frame;
  when it is determined that the center point of the blob has been detected, determining whether there are a preset minimum number of required frames between the reference frame and the frame in which the center point of the blob has been detected; and
  when it is determined that there are not the preset minimum number of required frames, determining whether the center point of the blob has been detected in a subsequent frame, and when it is determined that there are the preset minimum number of required frames, calculating axis-specific center point velocities of the blob using coordinate differences between the center point of the blob detected in the reference frame and the center point of the blob detected in the subsequent frame.

9. The method of claim 8, wherein the recognizing of the gesture of the gesture object comprises recognizing an axis on which the center point velocity of the blob is higher than the preset velocity as a gesture of the gesture object.

10. The method of claim 8, wherein the recognizing of the gesture of the gesture object comprises comparing the axis-specific center point velocities of the blob with each other and recognizing an axis on which the center point velocity of the blob is the highest as a gesture of the gesture object.

* * * * *